United States Patent
Mruk

[11] 3,908,446
[45] Sept. 30, 1975

[54] ULTRASONIC APPARATUS FOR WALL THICKNESS MEASUREMENT

[76] Inventor: Walter F. Mruk, 3700 Unit E. Albidale Dr., Huntingdon Valley, Pa. 19006

[22] Filed: Apr. 1, 1974

[21] Appl. No.: 456,842

[52] U.S. Cl............................. 73/67.8 S; 73/71.5 US
[51] Int. Cl.²......................................... G01N 29/04
[58] Field of Search............ 73/67.8 R, 67.8 S, 67.9, 73/71.5 US

[56] References Cited
UNITED STATES PATENTS

| | | | |
|---|---|---|---|
| 2,992,553 | 7/1961 | Joy | 73/67.8 S |
| 3,129,581 | 4/1964 | Bande | 73/67.8 S UX |
| 3,205,702 | 9/1965 | Joy | 73/71.5 US |
| 3,393,331 | 7/1968 | Puckett | 73/67.9 X |
| 3,413,843 | 12/1968 | Kortenhoven | 73/71.5 US |
| 3,548,644 | 12/1970 | O'Connor et al. | 73/71.5 US |
| 3,612,920 | 10/1971 | Bantz | 73/71.5 US |

*Primary Examiner*—Richard C. Queisser
*Assistant Examiner*—John P. Beauchamp
*Attorney, Agent, or Firm*—Ostrolenk, Faber, Gerb & Soffen

[57] ABSTRACT

Moving glass tube wall thickness is measured by apparatus in which ultrasonic pulses are applied to the tubing and the time taken for a pulse to traverse the wall thickness is measured. The ultrasonic pulses are conducted through a fluid which is in contact at the end of a stationary open tube with the inner diameter of a sound transmitting rotating cylinder. The glass moves over and engages an outer diameter of the cylinder and the cylinder rotates as the glass tube moves over its periphery. Ultrasonic pulses then enter the tube and are reflected by its outer and inner diameter surfaces to produce thickness related to reflections of the sound energy.

6 Claims, 4 Drawing Figures

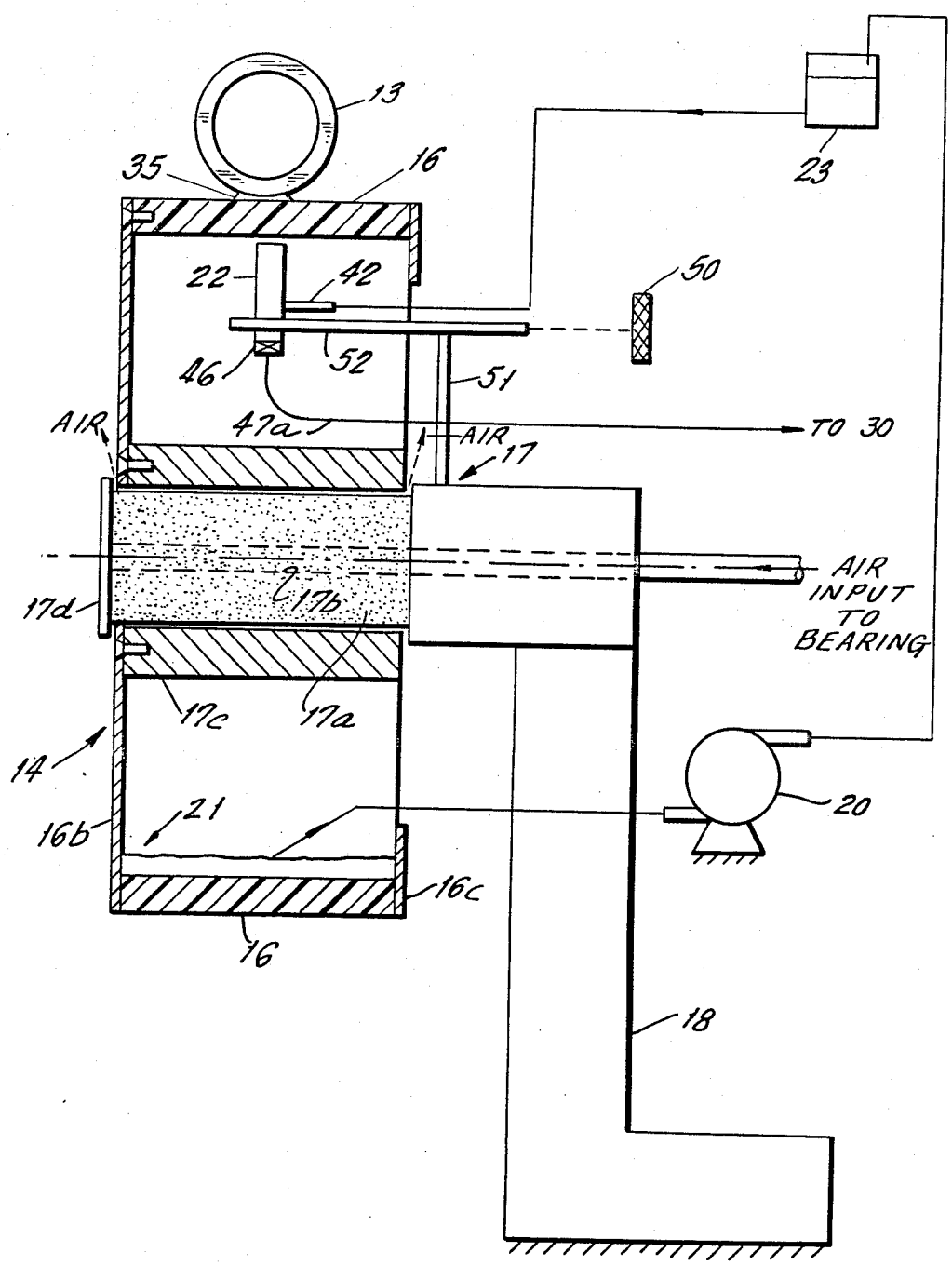

ULTRASONIC APPARATUS FOR WALL THICKNESS MEASUREMENT

BACKGROUND OF THE INVENTION

This invention relates to ultrasonic measurement apparatus for determining the thickness of the wall of tubing in a state of rest or motion over a wide range of temperatures, about room temperature. As will become clear, such apparatus is especially suitable for the controlled production of glass tubing.

It is frequently necessary to produce glass tubing of closely specified dimensions as input for further processing into other products. For example, glass tubing of precise outer diameter and wall weight (thickness) is required for apparatus producing devices such as medicinal dosage containers. Off-specification glass tubing can impair these apparatuses by jamming them, or be insufficient in quantity and/or shape to satisfy the inputs to these apparatuses. In either case, the result is useless product.

In a typical tubing production alley, the outer and inner diameters of the glass tubing are assumed to be functions of the drawing speed of the tubing in the alley and the gas pressure exerted on the interior of the tubing. To effect meaningful control over these parameters, it is necessary to make a precision measurement not only of the outer diameter of the tubing but also its wall weight while the glass is in a state of motion, but below its temperature state of plastic deformation.

Presently available devices are incapable of measuring the wall weight of the glass tubing while it is in a state of motion at temperatures at or well above room temperature. Moreover, off-line measurements are too slow to afford meaningful control action.

BRIEF SUMMARY OF THE INVENTION

In accordance with the invention, the time interval between any selected number of echoes, from the acoustical interfaces defining the tubing wall boundaries, of a suitably shaped ultrasonic parent-pulse is precisely measured. This time interval is directly representative of the tubing wall thickness through the velocity of propagation of longitudinal vibrations in the medium comprising the tubing.

In one embodiment of the invention, a fixed ultrasonic transducer is mounted within a rotatable, sound-transmitting wheel. The transducer is enclosed in a cylinder immersed in a replenishable liquid reservoir whose upper surface is made to wet the surface of the inner diameter of the wheel. Glass tubing in contact with and moving along with the outer diameter of the rotating wheel is acoustically coupled to the outer wheel surface by entrapment of a liquid sound couplant in the form of a mist, externally introduced, between the glass tubing and the outer surface of the wheel. Thus, an acoustic pulse emitted by the transducer is conducted via the continuously replenished reservoir to the inner diameter of the wheel. Part of the acoustic pulse is reflected from the interface formed by the liquid and wheel material inner surface while the remaining part is transmitted into the wheel material. The transmitted pulse undergoes a diminution at the interface formed by the wheel material outer surface and the external liquid sound couplant. The fraction of the sound transmitted in the liquid sound couplant to the subsequent liquid sound couplant and glass outer diameter wall interface is again further subjected to interface diminution due to acoustical reflection. The remaining transmitted part of the signal is multiply reflected between the glass tubing inner and outer diameters defining the wall thickness interfaces. The time interval between any multiple pair of subsequent echoes from the glass-air interface is directly representative of the wall thickness of the glass tube.

The novel configuration of the suitable materials and process of this invention permits extremely high precision in determining the wall thickness of the glass tubing. Further, the measuring equipment responds virtually immediately to extremely small variations in wall thickness so that corrective action may be meaningfully applied to the production process. Routine measurements have demonstrated precisions of 0.0001 inches and higher in the determination of the wall weight of glass tubing.

While the novel invention is described herein with reference to determining the thickness of glass tubing, it will be understood that the concepts may be applied to any measurement operation in which the use of ultrasound would ordinarily be excluded due to a hostile environment.

BRIEF DESCRIPTION OF THE DRAWINGS

FIG. 3 is an enlarged sectional view of the novel ultrasonic coupler of the present invention.

FIG. 4 is a section view through the axis of the device shown in FIGS. 2 and 3.

DETAILED DESCRIPTION OF THE DRAWINGS

Figure 1:
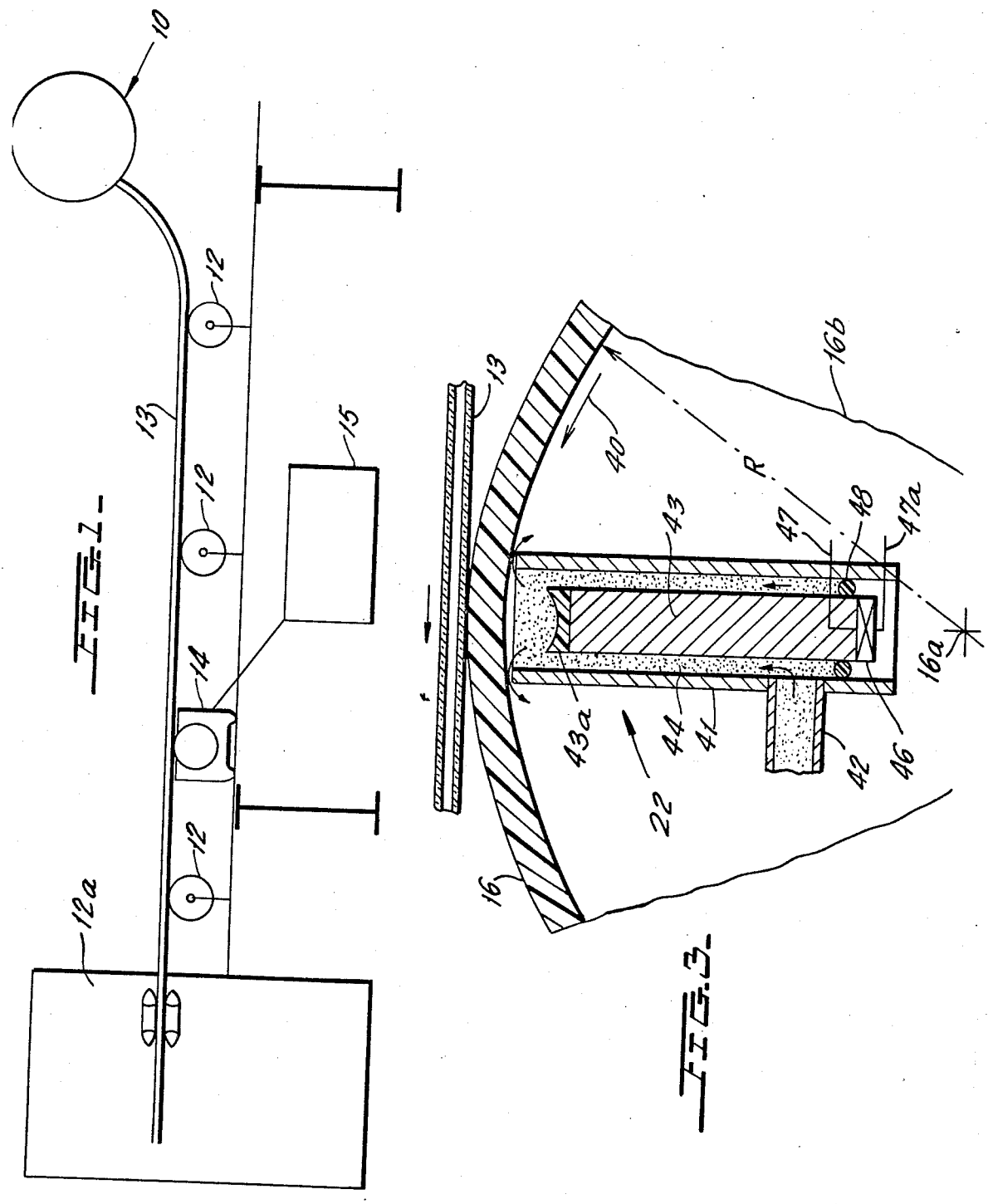
FIG. 1 is a schematic representation of a glass tubing process incorporating the wall weight (thickness) measuring apparatus of the present invention.

FIG. 1 schematically illustrates a section of a typical glass tubing alley to which the present invention can be applied. In the section illustrated, there is schematically shown a furnace 10 from which issues hollow molten glass tubing 13. Furnace 10 includes means for introducing gas into the tube 13 to maintain it under pressure. Tube 13 is conducted over idler rollers 12 by suitable means into a conventional cutting machine 12a which cuts the tubing into prescribed lengths. The linear speed of the glass tubing 13 in the process may be about 600 feet per minute. Typically, drawing and cutting machine 12a is located sufficiently far from furnace 10 that the temperature of the glass is below that at which the glass could be further readily deformed by additional drawing.

Presently, a pre-set drawing speed and air pressure within tube 13 are used as the external control parameters over the outer diameter and wall weight in the manner well known for such processes.

In accordance with the present invention, a signal is derived which is a measure of the wall weight of the glass tubing. The signal can be derived at any position along the tubing alley and, as soon as any variation from a desired or programmed condition is observed, correction can be immediately applied by appropriately varying the control parameters.

Figure 2:
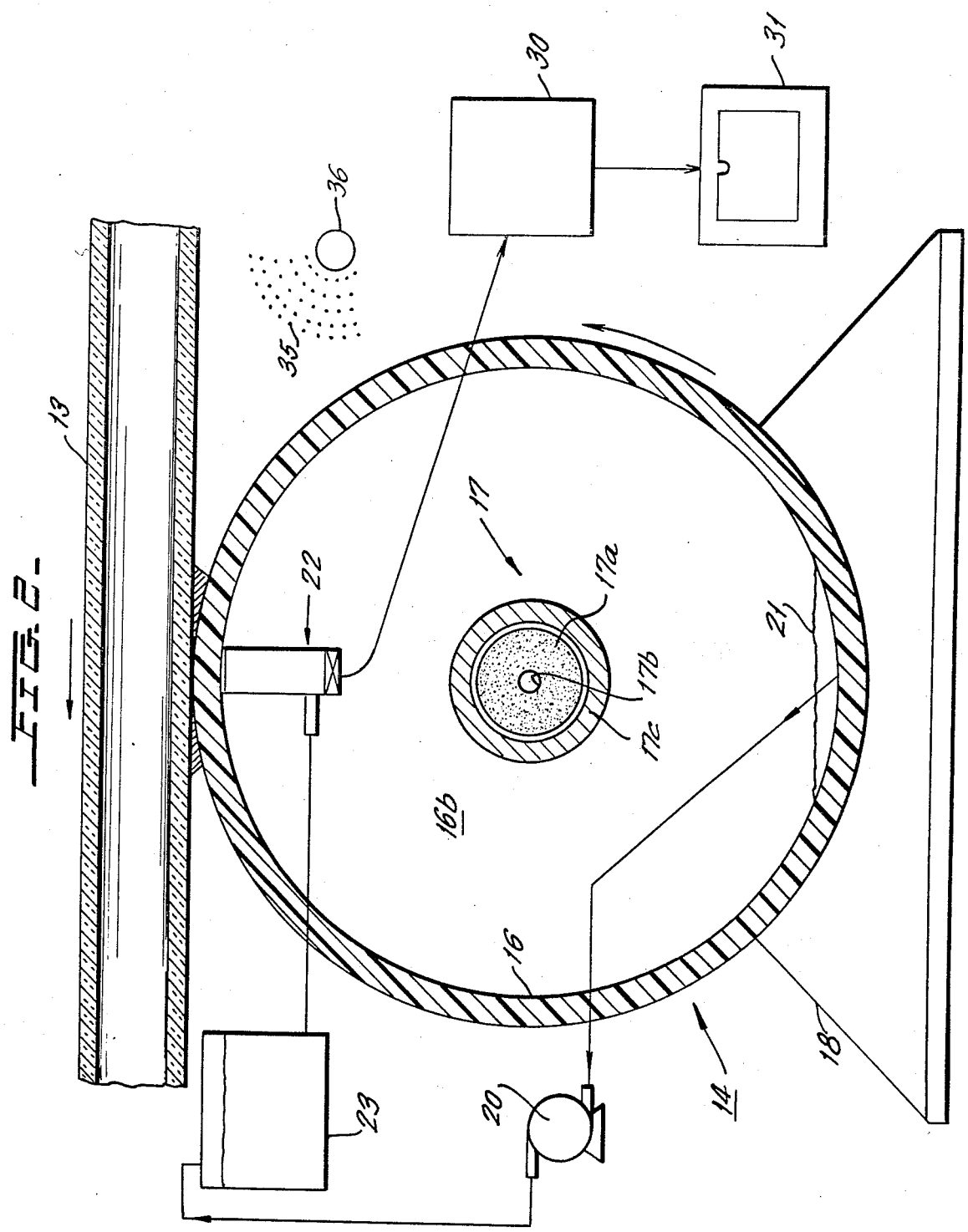
FIG. 2 is a partial block diagram of a portion of the apparatus of FIG. 1.

In FIG. 1, the thickness measuring apparatus 14 is coupled to the tube 13 and is further connected to thickness measuring circuits and display 15. FIG. 2 shows components 14 and 15 in more detail. Referring to FIGS. 2 and 4, device 14 includes a hollow circular drum formed of an outer cylindrical portion 16 and a side plate 16b. An annular disk 16c is also secured to cylinder 16 as shown in FIG. 4. Cylinder 16 is preferably formed of a high temperature polyimide resin of the type known by the trademark Vespel. This material has the property of being capable of transmitting acoustical energy, while being highly resistant to wear by the rolling engagement of the high temperature glass tube 13. Plate 16b and thus cylinder 16 are rotatably mounted on a fixed axle 17, and are rotated by the movement of tube 13 over its outer periphery. Axle 17 is in turn supported from frame 18 which would be mounted on the same table which carries members 12. Axle 17 may be of any desired type, but good results have been obtained with an air-type bearing. Thus, a porous cylindrical air bearing 17a, having an opening 17b therein, can be located within a steel sleeve 17c, with an annular air space formed between bearing 17a and sleeve 17c. A stop plate 17d (FIG. 4) secured to bearing 17a holds it with respect to plate 16b. Air connected to air line 17c then pressurizes the annular gap between members 17a and 17c to act as a low-friction bearing.

Cylinder 16 may have any desired dimensions and, typically, could have a five inch diameter and will have a cylindrical outer periphery having a width of 1 inch and a radial thickness of from one-eighth to one-fourth inch. The glass tube 13 running over the cylinder 16 can range in outside diameter from about 5 millimeters to 40 millimeters and have a thickness ranging from one-half millimeter to 2 millimeters.

FIGS. 2 and 4 further show an acoustical fluid supply system which includes a pump 20 which pumps fluid 21 accumulated in the bottom of cylinder 16 (and between plates 16b and 16c which are sealed to cylinder 16 to be leakproof) from a transducer 22 into fluid reservoir 23 and then back to transducer 22. Note that the fluid piping to transducer 22 and to fluid 21 to the reservoir 23 and pump 20 respectively passes through the open center of disk 16c so that the piping will not interfere with the free rotation of cylinder 16. Transducer 22 is supported in a fixed position within the interior of cylinder 16 by support members which may be connected to axle 17.

In FIGS. 2 and 4, the output of transducer 22, which will be later described in detail, is connected to processing circuits 30 which, in turn, drive recording instrument 31, which may be a chart recorder, and which displays the weight or wall thickness of tube 13 as it passes over cylinder 16. The circuits 30 and recorder 31 correspond to component 15 of FIG. 1. Note that the electrical leads from transducer 22 extend through the opening in disk 16c and will not interfere with the rotation of drum 16.

In order to ensure good acoustical contact between the outer diameter of cylinder 16 and the outer diameter of tube 13, an oil mist 35 is produced by mist source 36 to ensure a layer of oil at the junction between cylinder 16 and tube 13 to assist in the transmittal of ultrasonic sound from transducer 22 into tube 13.

FIG. 3 shows the transducer 22 in detail, and shows how transducer 22 is acoustically coupled to cylinder 16. Note that cylinder 16 has a radius R on center 16a. In FIG. 3, the transducer 22 is fixed relative to rotating cylinder 16 which rotates in the direction of arrow 40 at a peripheral speed equal to the speed of tube 13. Thus, when tube 13 moves at a linear speed of about 600 feet per minute, cylinder 16, if it has a 5 inch diameter, rotates relative to transducer 22 at about 460 RPM.

Transducer 22 consists of an outer cylindrical shell 41 which has an input tube 42 connected to the wall thereof, which is connected to the reservoir 23. A central solid steel cylinder 43 is fixed as by a suitable spider, or the like, in the interior of shell 41 and defines an annular channel 44 extending along a major portion of the length of shell 41. Note that channel 44 need not be an annular channel, but simply is a conduit to carry transducer coupling fluid from tube 42 to the top of shell 41. The bottom of cylinder 43 (or of channel 44) is sealed by a suitable sealing "O" ring 48.

The top of steel cylinder 43 has a concave element 43a, which may be of any desired material which is cemented to cylinder 43 and acts to focus ultrasonic energy toward the junction between tube 13 and cylinder 16. The bottom of cylinder 43 is cemented to a conventional acoustical crystal 46 which can introduce and detect acoustical pulses in cylinder 43. A pair of electrodes 47 and 47a of crystal transducer 46 are connected to circuit 30 through the opening in disk 16c (FIGS. 2 and 4).

It was previously indicated that transducer 22 is fixedly mounted within cylinder 16. The mount for transducer 22 should allow adjustable mounting so that the upper end of shell 41 can be closely spaced from the interior of cylinder 16, but is not in physical contact therewith. Thus, a conventional micro-positioner 50, schematically shown in FIG. 4, is connected to transducer 22 by support braces 51 and 52, to support transducer 22 and allow its adjustment in three dimensions.

The actual acoustical contact between transducer 22 and cylinder 16 is obtained through a fluid column caused by the flow of fluid from tube 42 and upward through shell 41 and out of its upper end. Preferably, the spacing is about equal to the height of the meniscus which is formed at the top of shell 41 under static conditions.

In one embodiment of the invention, the upper end of tube 41 was spaced from cylinder 16 by about one-sixteenth inch; shell 41 had a diameter of about three-eighths inch; and oil from pipe 42 flowed into shell 41 (and out of its upper end and down into the bottom of cylinder 16 to form fluid 21) at a rate of about 0.05 gallons per minute.

The fluid between the top of member 43a permits the coupling of acoustical pulses from crystal 46 to cylinder 16, through the wall of cylinder 16 and into tube 13. Acoustical pulses returned from the outer diameter and inner diameters of tube 13 are then received by transducer crystal 46 and the time between pulse returns is related to the wall thickness or weight of the tube 13.

Electronic circuits 30 of FIG. 2 are selected to produce suitable output pulses from crystal 46 and gating circuits to allow selection of return pulses from the outer and inner walls of tube 13. The output related to spacing between the return pulses from the tube 13 are then presented in the recorder 31, and may otherwise be used to control the production process parameters.

Although this invention has been described with respect to preferred embodiments, it should be understood that many variations and modifications will now be obvious to those skilled in the art, and it is preferred, therefore, that the scope of this invention be limited, not by the specific disclosure herein, but only by the appended claims.

The embodiments of the invention in which an exclusive privilege or property is claimed are defined as follows:

1. Apparatus for measuring the thickness of a moving elongated body; said apparatus comprising a hollow rotatable cylinder of acoustical energy transmission material and means rotatably mounting said rotatable cylinder; a transducer disposed in the interior of said rotatable cylinder; a source of fluid, which fluid acoustically couples said transducer to the interior of said rotatable cylinder; said moving elongated body moving over the outer surface of said cylinder; said transducer comprising an elongated hollow cylinder and a source and receptor of acoustical pulses disposed within said cylinder; one end of said transducer cylinder being disposed adjacent to and closely spaced from the interior of said rotatable cylinder; said source of fluid connected to the interior of said transducer cylinder and producing a continuous fluid column extending from said source of acoustical pulses to said interior of said rotatable cylinder, whereby pulses from said source and receptor of acoustical pulses reflected by the opposite surfaces of said moving elongated body can be sensed by said source and receptor of acoustical pulses; and electronic processing circuit means for monitoring said reflected pulses and producing an output related to the thickness of said moving elongated body; said one end of said transducer cylinder being spaced from the interior of said rotatable cylinder by about the height which would be formed by the meniscus of said fluid in said transducer cylinder under static conditions; said transducer cylinder being vertically disposed with said one end of said transducer cylinder being upwardly disposed; fluid from said source of fluid continuously flowing out of said transducer cylinder and into the interior bottom of said rotatable cylinder.

2. The apparatus of claim 1 which further includes indicating apparatus connected to said transducer for indicating the thickness of said moving elongated body.

3. The apparatus of claim 1 wherein said moving elongated body is a hollow glass tube, and wherein the wall thickness of said tube is to be measured.

4. The apparatus of claim 3 which further includes oil mist means for continuously wetting the outer diameter of said tube at its region of engagement with said rotatable cylinder.

5. The apparatus of claim 1 wherein said rotatable cylinder is of Vespel.

6. The apparatus of claim 4 wherein said rotatable cylinder is of Vespel.

* * * * *